United States Patent [19]
Lauchlan et al.

[11] 3,821,326
[45] June 28, 1974

[54] POLYCARBONATE-VINYLIDENE FLUORIDE HEXAFLUOROPROPYLENE COPOLYMER BLEND

[75] Inventors: Robert L. Lauchlan, Granger, Ind.; Hugh E. Snodgrass, Arcadia, Calif.

[73] Assignee: Uniroyal, Inc., New York, N.Y.

[22] Filed: May 3, 1972

[21] Appl. No.: 249,860

[52] U.S. Cl. .............................................. 260/873
[51] Int. Cl. ........................................... C08g 39/10
[58] Field of Search ................................... 260/873

[56] References Cited
UNITED STATES PATENTS
3,281,498   10/1966   Watkins Jr. et al .............. 260/873

OTHER PUBLICATIONS
Chemical Abstracts, Vol. 72, 1970, p. 42 (56386j).

*Primary Examiner*—William H. Short
*Assistant Examiner*—T. Pertilla
*Attorney, Agent, or Firm*—Thomas A. Beck

[57] ABSTRACT

Blends of polycarbonate resin with vinylidene fluoride-hexafluoropropylene copolymer are characterized by improved impact strengths, and especially by reduced notch width sensitivity.

6 Claims, No Drawings

POLYCARBONATE-VINYLIDENE FLUORIDE HEXAFLUOROPROPYLENE COPOLYMER BLEND

BACKGROUND OF THE INVENTION

It is known that polycarbonate plastics exhibit high notched Izod (ASTMD-256A-56) impact strengths. This value, however, is dependent upon the thickness of the test specimen, and thus polycarbonate plastics are termed "notch width sensitive," indicating that the observed impact strength of the plastic is inversely related to the thickness of the test specimen. Typical notched Izod impact values for ⅛ inch specimens are about 16 ft. lbs./in. On the other hand, ¼ inch specimens exhibit notched Izod impact values of only about 2.5 ft. lbs./in. The notch width sensitivity of polycarbonate polymers causes serious problems, especially when molded articles or extruded sheets and rods greater than about ⅛ inch thickness are desired. In other words, the use of polycarbonate plastics is generally limited to articles of manufacture having thicknesses no greater than one-eighth inch. Examples of the notch width sensitivity of polycarbonate plastics are cited in U.S. Pat. No. 3,437,631, the text of which is incorporated herein by reference.

STATEMENT OF THE INVENTION

The present invention relates to unique polycarbonate resin blends which do not exhibit the notch width sensitivity typical of unmodified polycarbonate plastics. Specifically, the incorporation of 1 to 25 percent (all percentages expressed by weight herein) of a vinylidene fluoridehexafluoropropylene copolymer with a polycarbonate resin results in compositions having high impact strengths, regardless of the thickness of the test specimens. Incorporation of the vinylidene fluoride-hexafluoropropylene copolymer does not adversely affect the desirable properties of the polycarbonate resin, e.g., the high heat distortion temperature and mechanical strength properties of the resin.

DESCRIPTION OF THE INVENTION

The present invention provides polyblends containing: A) between about 75 and 99 percent of a polycarbonate resin in admixture with B) between about 1 and 25 percent of a vinylidene fluoride-hexafluoropropylene copolymer.

Any suitable polycarbonate resin such as those disclosed in U. S. Pats. Nos. 2,964,794, 3,028,265, 3,153,008, 3,187,065 and 3,215,668 may be used. For example, in U.S. Pat. No. 3,028,365, polycarbonates are obtained by reacting di(monohydroxyl)alkanes with derivatives of a carbonic acid selected from the group consisting of carbonic acid diesters, phosgene, and bischlorocarbonic esters of di(monohydroxyaryl)alkanes. The di (monohydroxyaryl)alkanes can be re-esterified with carbonic acid diesters, e.g., dimethyl, diethyl, dipropyl, dibutyl, diamyl, dioctyl, dicyclohexyl, diphenyl, tolyl and di-o-tolyl, di-p-tolyl carbonate at elevated temperatures from about 50° to about 320° C. and especially from about 120° to about 280° C.

The polycarbonates can also be prepared by introducing phosgene into solutions of di(monohydroxyaryl) alkanes in organic bases, such as dimethyl aniline, diethyl aniline, triethyl amine, and pyridine or into solutions of di(monohydroxyaryl)alkanes in organic solvents, such as benzene, ligroin, cyclohexane, methylcyclohexane, toluene, xylene, chloroform, methylene chloride, carbon tetrachloride, trichloro ethylene, dichloro ethane, methyl acetate and ethyl acetate with the addition of an acid binding agent as mentioned above.

A process particularly suitable for producing polycarbonates consists in introducing phosgene into an aqueous solution or suspension of alkali metal salts, such as, lithium, sodium, potassium, and calcium salts of the di(monohydroxyaryl)alkanes, preferably in the presence of an excess of a base such as lithium, sodium, potassium, and calcium hydroxide or carbonate. The polycarbonate precipitates out from the aqueous solution. The conversion in the aqueous solution is promoted by the addition of solvents of the kind mentioned above which are capable of dissolving phosgene and eventually the produced polycarbonate.

High molecular weight polycarbonates may be produced from a great number of dihydroxy compounds, that is, of aliphatic, cycloaliphatic and aromatic dihydroxy compounds, preferably from aromatic dihydroxy compounds. The preferred high molecular weight polycarbonates thus formed may be represented by the formula

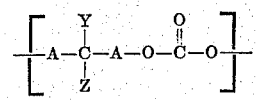

wherein each — A — is selected from the group consisting of phenylene, halo substituted phenylene and alkyl substituted phenylene and Y and Z are each selected from the group consisting of hydrogen, hydrocarbon radicals free from aliphatic unsaturation and of radicals which together and with the adjoining carbon atoms form a cycloalkane radical, the total number of carbon atoms in Y and Z being up to about 12 .

Aromatic dihydroxy compounds are the di(monohydroxyaryl) alkanes such as 1,1-bis-(4-hydroxyphenyl)ethane,
1,1-bis-(4-hydroxyphenyl)-butane,
1,1-bis-(4-hydroxyphenyl)-2-methylpropane,
1,1-bis-(4-hydroxyphenyl)-heptane,
1,1-bis-(4-hydroxyphenyl)-1-phenyl-methane,
bis-(4-hydroxyphenyl)-4methylphenyl-methane,
bis-(4-hydroxyphenyl)-4-ethyl-phenyl-methane,
bis-(4-hydroxyphenyl)-4-isopropylphenyl-methane,
bis-(4-hydroxyphenyl)-4-butylphenyl-methane,
bis-(4-hydroxphenyl)-benzyl methane,
bis-(4-hydroxyphenyl)-alpha-furyl-methane,
2,2-bis-(4-hydroxyphenyl)-propane,
2,2-bis-(4-hydroxyphenylene)-butane,
2,2-bis-(4-hydroxyphenyl)-pentane,
2,2-bis-(4-hydroxyphenyl)-4-methyl-pentane,
2,2-bis-(4-hydroxyphenyl)-octane,
1,1-bis-(4-hydroxyphenyl)-1-phenyl ethane,
3,3-bis-(4-hydroxyphenyl)pentane,
2,2-bis-(4-hydroxyphenyl)-decahydronaphthalene,
2,2-bis-(4-hydroxy-3-cyclohexylphenyl)-propane,
2,2-bis-(4-hydroxy-3-butyl-phenyl)-propane,
1,1-bis-(4-hydroxy-3-methyl-6-butylphenyl)-butane, 1,1-bis-(4-hydroxy-3-methyl-6-tertiary-butylphenyl)-butane,
1,1-bis-(4-hydroxy-3-methyl-6-tertiary-butylphenyl)-heptane, 1,1-bis-(4-hydroxy-3-methyl-6-tertiary-butylphenyl)-2-ethyl-2-hexane.

Other aromatic dihydroxy compounds are the di(monohydroxyaryl)sulfones such as
bis-(4-hydroxyphenyl)-sulfone,
bis-(2-hydroxyphenyl)sulfone,
bis-(3-hydroxyphenyl)-sulfone,
bis-(4-hydroxy-2-methylphenyl)sulfone,
bis-(4-hydroxy-3-methylphenyl)sulfone,
bis-(2-hydroxy-4-methylphenyl)sulfone,
bis-(4-hydroxy-2-ethylphenyl)-sulfone,
bis-(4-hydroxy-3-ethylphenyl)sulfone,
bis-(4-hydroxy-2-tertiary-butylphenyl)sulfone,
bis-(4-hydroxy-3-tertiary-butylphenyl)-sulfone, and
bis-(2-hydroxy-1-naphthyl)sulphone.

Diphydroxy aromatic ethers such as p,p'-dihydroxydiphenyl ether, p,p'-dihydroxytriphenylether, the 4,3', 4,2'-, 4,1'-, 2,2'-, 2,3'-, etc., dihydroxy ethers may also be used. Examples of other ethers are bis-(4-hydroxy-3-isobutyl-phenyl)-ether, 4,4'-dihydroxy-2,6-dimethyldiphenyl ether, 4,4'-dihydroxy —2, 5 — dimethyldiphenyl ether, 4,4'-dihydroxy-3,2-dinitrodiphenyl ether and the like.

Among the great number of suitable di(monohydroxyaryl)-alkanes, the bis-(4-hydroxyphenyl) alkanes are preferred, especially 2,2-bis-(4-hydroxyphenyl)-propane.

Suitable examples of aliphatic dihydroxy compounds are ethylene glycol, diethylene glycol, triethylene glycol, polyethylene glycol, thiodiglycol, ethylene dithiodiglycol, the di- and poly-glycols produced from propylene oxide-1,2, o-, m-, and p-xylene glycol, propanediol-1,3, butanediol-1,3, butanediol-1,4, 2-methylpropanediol-1,3, pentanediol-1,5, 2 — ethylpropanediol — 1,3, hexanediol-1,6, octanediol-1,8,1-ethylhexandeiol-1,3, and decanediol-1,10.

Examples of the cycloaliphatic dihydroxy compounds are cyclohexanediol-1,4, cyclohexanediol-1,2, 2,2-bis-(4-hydroxy-cyclohexyl)-propane, and 2,6-dihydroxydecahydronaphthanlene.

In the production of polycarbonates according to the various processes, it is advantageous to employ small amounts of reducing agents, for example, sodium or potassium sulfide, -sulfite, and -dithionite or free phenol and p-tertiarybutylphenol.

By adding monofunctional compounds which are capable of reacting with phosgene or with the end groups of the polycarbonate consisting of the chlorocarbonic acid ester group and which terminate the chains, such as phenols, for instance, a phenol, tertiary butyl phenol, cyclohexyl phenol and 2,2 — (4,4 — hydroxyphenyl — 4' — methoxyphenyl)-propane and other monofunctional compounds such as aniline and methyl aniline, it is possible to regulate the molecular weight of the polycarbonate.

The vinylidene fluoride hexafluoropropylene copolymers which are used in the invention is concerned are rubber-like materials derived from copolymerization of the monomers:

I.) 

II.) 

As an embodiment of this invention it is preferred the rubbery copolymer contain from 30 to 70 percent by weight I.) hexafluoropropylene units, and correspondingly from 70 to 30 percent by weight II.) vinylidene fluoride units. Most preferred are the copolymers containing about 40 percent hexafluoropropene units and correspondingly about 60 percent vinylidene fluoride units, as these copolymers form homogeneous mixtures with the preferred types of polycarbonate resins previously described. The preparation of vinylidene fluoride hexafluoropropylene copolymers is described in U.S. Pat. No. 3,400,065.

In the compositions of the present invention, the vinylidene fluoride-hexafluoropropylene copolymer comprises from 1 to 25 percent of the blend, and more preferably from 5 to 20 percent of the blend. When more than 25 percent vinylidene fluoride-hexafluoropropylene copolymer is added to the polycarbonate resin, it becomes very difficult to obtain a substantially homogeneous mixture which can be formed into a shaped article. Correspondingly, the polycarbonate resin constitutes at least 75 percent of the blend and more preferably between 80 and 95 percent of the blend.

The method of blending the polycarbonate matrix resin with the vinylidene fluoride-hexafluoropropylene copolymer is not critical, and does not constitute a part of this invention. Preferably the matrix resin and copolymer are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at temperatures above the softening point of the resin so that the copolymer is thoroughly dispersed in the resin.

Alternatively the matrix resin and copolymer may be solution blended by dissolving the polymers in a solvent such as methyl ethyl ketone and subsequently precipitating the polymer blend by adding the solution to a non-solvent such as isopropanol, producing a homogeneous blend which is then dried by a suitable method.

The blends of the invention may contain certain other additives to plasticize, lubricate, dye, pigment, prevent oxidation of, retard flammability of, etc., the resin blends. Such additives are well known in the art and may be incorporated without departing from the scope of the invention.

The advantage which results from this invention is that it provides a new class of polycarbonate resin blend compositions characterized by a unique combination of physical properties. In particular, one may advantageously utilize the good thermal and mechanical properties of the polycarbonate resin, and through the incorporation of a vinylidene fluoride-hexafluoropropylene copolymer obtain compositions having very high impact strength over a wide range of thicknesses. Notch width sensitivity is not evident in the polyblends of the present invention.

Further benefits obtained by blending a vinylidene fluoride-hexafluoropropylene copolymer with a poly-

EXAMPLE 1

A vinylidene fluoride-hexafluoropropylene copolymer was blended with a thermoplastic polycarbonate resin at the 10 percent by weight level. The polycarbonate resin was made up of repeating units of the formula:

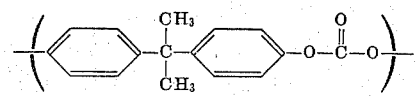

The polycarbonate resin was manufactured by General Electric Co., coded Lexan 101-112, and characterized by an intrinsic viscosity of 0.54 in dioxane at 30° C. and a specific gravity of 1.20. The vinylidene fluoride-hexafluoropropylene was designated Viton B, and contained approximately 40 percent by weight hexafluoropropene units and 60 percent by weight vinylidene fluoride units. The copolymer possessed a Mooney viscosity of 120 (ML10 at 212° F.).

The polymers were blended in a Banbury internal shear mixer at a temperature of 400° F. and a shear rate of 300 sec. $^{-1}$. The polyblend was subsequently milled and calendered at 425° F., and then compression molded into plaques ranging in thickness from one-eighth inch to one-half inch at 425° F. and 350 psi.

The impact strength of the polyblend was measured following the procedure of ASTM D 256A-56. A comparison of the impact strengths of the polyblend and the unmodifed resin at various thicknesses is outlined in Table 1.

TABLE 1

| POLYBLEND | | RESIN | |
|---|---|---|---|
| THICKNESS (IN.) | NOTCHED IZOD IMPACT STRENGTH FT.LBS./IN | THICKNESS (IN.) | NOTCHED IZOD IMPACT STRENGTH FT. LBS./IN. |
| 0.137 | 14.13 | .118 | 15.8 |
| 0.222 | 14.08 | .225 | 8.4 |
| 0.366 | 12.94 | .373 | 2.7 |
| 0.493 | 15.09 | .500 | 2.4 |

Table 1 shows that as the thickness of the polyblend sample is increased the notched izod impact strength remains relatively constant whereas the notched izod impact strength of the samples prepared from the unmodified resin decreases as the thickness increases.

EXAMPLE 2

The vinylidene fluoride-hexafluoropropylene copolymer of Example 1 was blended with a plycarbonate resin of Example 1 at the 5, 10, 15, 20 percent by weight levels. The polymers were blended, fabricated and tested as described in Example 1. The impact strengths of the polyblends at a thickness of about 0.50 inch are outlined in Table 2.

TABLE 2

| | NOTED IZOD IMPACT STRENGTH (Ft. Lbs./In.) |
|---|---|
| 100% Polycarbonate | 2.4 |
| 95% Polycarbonate/ 5% vinylidene fluoride-hexafluoropropylene | 16.98 |
| 90% Polycarbonate/ 10% vinylidene fluoride-hexafluoropropylene | 15.09 |
| 85% Polycarbonate/ 15% vinylidene fluoride-hexafluoropropylene | 14.83 |
| 80% POLYCARBONATE/ 20% vinylidene fluoride-hexafluoropropylene | 11.39 |

The impact strength of the polyblends is less sensitive to the thickness of the test speciman than the impact strength of the unmodifed polycarbonate resin.

Because of their unique combination of high impact strength, regardless of thickness, and good thermal and mechanical properties, the polyblends of this invention have many and varied uses. For example, they can be used as mold compounds for the production of enclosures, furniture, and other goods where high impact strength is required. They can be used to prepare extruded sheets and shapes for outdoor siding and similar applications which require high impact strength.

Obviously, other modifications and variations of the present invention are possible in light of the above disclosures. It is therefore, to be understood that changes may be made in the particular embodiments of the invention described which are within the full intended scope of the invention as defined by the appended claims.

Having thus described our invention, what we claim and desire to protect by letters patent is:

1. A polymer blend composition comprising
   a. between about 75 and 99 percent by weight of a resin containing repeating units having the formula $$\left[ -A-\overset{Y}{\underset{Z}{C}}-A-O-\overset{O}{\underset{\|}{C}}-O- \right]$$

wherein each A is selected from the group consisting of phenylene, halo substituted phenylene and alkyl substituted phenylene, and Y and Z are each selected from the group consisting of hydrogen, hydrocarbon radicals free from aliphatic unsaturation, and radicals which together and with the adjoining carbon atom from a cycloalkane radical, the total number of carbon atoms in Y and Z being up to about 12, and correspondingly (b) from 25 to 1 percent be weight of a vinylidene fluoride-hexafluoropropylene copolymer derived from the monomers.

I.)    II.) 

2. The polymer blend defined in claim 1 wherein
A. is made up of repeating units having the formula:

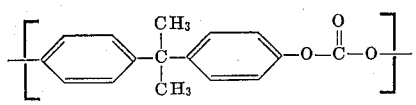

3. The polymer blend of claim 1 where the vinylidene fluoride-hexafluoropropylene copolymer consists of from 70 to 30 percent by weight vinylidene fluoride units and correspondingly from 30 to 70 percent by weight hexafluoropropylene units.

4. The polymer blend of claim 1 where the vinylidene fluoride-hexafluoropropylene copolymer consists of about 60 percent vinylidene fluoride units and correspondingly about 40 percent hexafluoropropylene units.

5. The polymer blend of claim 2 where the vinylidene fluoride-hexafluoropropylene copolymer consists of from 70 to 30 percent by weight vinylidene fluoride units and correspondingly from 30 to 70 percent by weight hexafluoropropylene units.

6. The polymer blend of claim 2 where the vinylidene fluoride-hexafluoropropylene copolymer consists of bout 60 percent vinylidene fluoride units and correspondingly about 40 percent hexafluoropropylene units.

* * * * *